(12) United States Patent
Hong et al.

(10) Patent No.: US 9,070,327 B2
(45) Date of Patent: Jun. 30, 2015

(54) METHOD AND APPARATUS FOR DRIVING CELL ARRAY DRIVEN BY ELECTRIC FIELD

(75) Inventors: Mun Pyo Hong, Seongnam-Si (KR); Ho Won Yoon, Seoul (KR); Hyo Joo Park, Busan (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 168 days.

(21) Appl. No.: 13/977,764

(22) PCT Filed: Dec. 26, 2011

(86) PCT No.: PCT/KR2011/010084
§ 371 (c)(1),
(2), (4) Date: Jul. 1, 2013

(87) PCT Pub. No.: WO2012/093793
PCT Pub. Date: Jul. 12, 2012

(65) Prior Publication Data
US 2013/0278588 A1  Oct. 24, 2013

(30) Foreign Application Priority Data
Jan. 7, 2011 (KR) .......... 10-2011-0001729

(51) Int. Cl.
*G09G 3/34* (2006.01)
*G02F 1/167* (2006.01)
*G09G 3/20* (2006.01)

(52) U.S. Cl.
CPC .......... *G09G 3/3446* (2013.01); *G02F 1/167* (2013.01); *G02F 2001/1676* (2013.01); *G09G 3/20* (2013.01)

(58) Field of Classification Search
CPC ............ G02F 1/167; G09G 3/34; G09G 3/20
USPC ........................ 345/107, 211, 212
See application file for complete search history.

(56) References Cited

U.S. PATENT DOCUMENTS

| | | | |
|---|---|---|---|
| 2003/0011869 A1* | 1/2003 | Matsuda et al. | 359/296 |
| 2007/0040982 A1* | 2/2007 | Nakano et al. | 349/149 |
| 2009/0103159 A1* | 4/2009 | Cheng et al. | 359/228 |
| 2009/0244105 A1* | 10/2009 | Lee et al. | 345/690 |
| 2010/0053135 A1* | 3/2010 | Van Delden et al. | 345/208 |
| 2010/0245408 A1* | 9/2010 | Matsuoka et al. | 345/690 |

FOREIGN PATENT DOCUMENTS

| | | |
|---|---|---|
| JP | 2008-020774 | 1/2008 |
| JP | 2010-511184 | 4/2010 |
| KR | 10-2009-0013786 | 2/2009 |
| KR | 10-2011-0048379 | 5/2011 |

* cited by examiner

*Primary Examiner* — Pegeman Karimi
(74) *Attorney, Agent, or Firm* — Lexyoume IP Meister, PLLC (57) ABSTRACT

The present disclosure relates to an apparatus for driving an electric field driven cell array including a plurality of electric field driven cells, in which each of the electric field driven cells includes a first electrode, a second electrode, and a third electrode, which are provided on a substrate and insulated from one another, and an actuator movable between the first electrode and the second electrode, the apparatus including, a common voltage supply unit for supplying common voltage, a gate driver for supplying gate voltage, and a data driver for supplying data voltage.

18 Claims, 5 Drawing Sheets

| PREVIOUS STATE OF THE ACTUATOR | GATE VOLTAGE ($V_G$) | DATA VOLTAGE ($V_D$) | CURRENT STATE OF THE ACTUATOR |
|---|---|---|---|
| POSITION ADJACENT TO THE FIRST ELECTRODE | H | H | MAINTAINING THE PREVIOUS STATE |
| | H | L | POSITION ADJACENT TO THE SECOND ELECTRODE |
| | L | H | MAINTAINING THE PREVIOUS STATE |
| | L | L | MAINTAINING THE PREVIOUS STATE |
| POSITION ADJACENT TO THE SECOND ELECTRODE | H | H | POSITION ADJACENT TO THE FIRST ELECTRODE |
| | H | L | MAINTAINING THE PREVIOUS STATE |
| | L | H | MAINTAINING THE PREVIOUS STATE |
| | L | L | MAINTAINING THE PREVIOUS STATE |

| PREVIOUS STATE OF THE ACTUATOR | GATE VOLTAGE($V_G$) | DATA VOLTAGE($V_D$) | CURRENT STATE OF THE ACTUATOR |
|---|---|---|---|
| POSITION ADJACENT TO THE FIRST ELECTRODE | H | H | POSITION ADJACENT TO THE SECOND ELECTRODE |
| | | L | MAINTAINING THE PREVIOUS STATE |
| | L | H | MAINTAINING THE PREVIOUS STATE |
| | | L | MAINTAINING THE PREVIOUS STATE |
| POSITION ADJACENT TO THE SECOND ELECTRODE | H | H | MAINTAINING THE PREVIOUS STATE |
| | | L | POSITION ADJACENT TO THE FIRST ELECTRODE |
| | L | H | MAINTAINING THE PREVIOUS STATE |
| | | L | MAINTAINING THE PREVIOUS STATE |

METHOD AND APPARATUS FOR DRIVING CELL ARRAY DRIVEN BY ELECTRIC FIELD

TECHNICAL FIELD

The present disclosure relates to an apparatus and a method for driving a cell array driven by an electric field, which is useful for an electronic paper display device and others, in particular, to an apparatus and a method for driving a cell array driven by an electric field using an actuator having no permanent charge.

BACKGROUND ART

Generally, since an electronic paper uses a reflective display having a memory function, it does not require a light source needed for a conventional liquid crystal display device and it does not require continuous power consumption as required in OLED, it can be driven with low power.

Current representative methods for expressing electronic paper display include (i) an electrophoretic method (E-INK, SiPix), whether colored charged particles, which have been mixed in oil, are stored in microcapsule or not, which enables the charged particles to respond to application of an electric field (ii) a twist ball method (Gyricon media), which rotates spherical particles consisting of top and bottom hemispheres having opposite charges and different colors by using an electric field, (iii) a QR_LPD method (Quick Response-Liquid Powder Display, Bridgestone), which operates charged particles under a dry environment, and (iv) a liquid crystal display method (Kent Display) using selective reaction of cholesteric liquid crystal molecules.

Among the methods, the electrophoretic method is the most representative for electronic paper display. Particles used for electronic paper display of the electrophoretic method have permanent charges. However, particles having permanent charges have high driving voltage, a slow response speed, and difficulty in gradation expression. In addition, in order to realize a digital image, an active matrix addressing (AM addressing) driving method, which separately provides a switching device and a capacitance device such as a transistor and a diode for each pixel to record necessary information for each pixel, should be used. To the end, an expensive thin film transistor (TFT) array backplane apparatus is required.

In case of an electronic paper of the cholesteric liquid crystal display method, a passive matrix (PM) addressing driving method, which does not separately require the switching device and the capacitance device, may be used. However, image quality is deteriorated compared to the active matrix addressing driving method, and a high resolution large scale panel cannot be driven.

DISCLOSURE OF INVENTION

Solution to Problem

Some embodiments of the present disclosure provide an apparatus and a method for driving an electric field driven cell array, which the apparatus and the method are capable of effectively driving an electric field driven cell array including electric field driven cells by using a new method including an actuator having no permanent charge.

With respect to technical means to solve the above-described problems, a first aspect of the present disclosure relates to an apparatus for driving an electric field driven cell array including a plurality of electric field driven cells, wherein each of the electric field driven cells includes a first electrode, a second electrode, and a third electrode, which are provided on a substrate and insulated from one another, and an actuator movable between the first electrode and the second electrode, wherein the first electrode and the second electrode are spaced from each other with a predetermined distance, and the third electrode is disposed below the first electrode, the apparatus including a common voltage supply unit for supplying a common voltage to the first electrode of the electric field driven cell, a gate driver for supplying a gate voltage to the second electrode of the electric field driven cell by a gate line, and a data driver for supplying a data voltage to the third electrode of the electric field driven cell by a data line, wherein the actuator is positioned adjacent to the first electrode or the second electrode in accordance with supply state of the gate voltage and the data voltage.

A second aspect of the present disclosure relates to an apparatus for driving an electric field driven cell array including a plurality of electric field driven cells, wherein each of the electric field driven cells includes a first electrode, a second electrode, and a third electrode, which are provided on a substrate and insulated from one another, and an actuator movable between the first electrode and the second electrode, wherein the first electrode and the second electrode are spaced from each other with a predetermined distance, and the third electrode is disposed below the first electrode, the apparatus including a common voltage supply unit for supplying a common voltage to the first electrode of the electric field driven cell, a gate driver for supplying a gate voltage to the third electrode of the electric field driven cell by a gate line, and a data driver for supplying a data voltage to the second electrode of the electric field driven cell by a data line, wherein the actuator is positioned adjacent to the first electrode or the second electrode in accordance with supply state of the gate voltage and the data voltage.

A third aspect of the present disclosure relates to a method for driving an electric field driven cell array including a plurality of electric field driven cells, wherein each of the electric field driven cells includes a first electrode, a second electrode, and a third electrode, which are provided on a substrate and insulated from one another, and an actuator movable between the first electrode and the second electrode, wherein the first electrode and the second electrode are spaced from each other with a predetermined distance, and the third electrode is disposed below the first electrode, the method including applying a certain level of common voltage to the first electrode of the electric field driven cell, activating a gate line of an electric field driven cell, which is desired to operate, by selectively applying a gate voltage to the second electrode of the electric field driven cell, and positioning the actuator at a position adjacent to the first or second electrode, by selectively applying a data voltage to the third electrode of the electric field cell.

A fourth aspect of the present disclosure relates to a method for driving an electric field driven cell array including a plurality of electric field driven cells, wherein each of the electric field driven cells includes a first electrode, a second electrode, and a third electrode, which are provided on a substrate and insulated from one another, and an actuator movable between the first electrode and the second electrode, wherein the first electrode and the second electrode are spaced from each other with a predetermined distance, and the third electrode is disposed below the first electrode, the method including applying a certain level of common voltage to the first electrode of the electric field driven cell, activating a gate line of an electric field driven cell, which is desired to operate, by selectively applying a gate voltage to the third electrode of the electric field driven cell, and positioning the actuator at a position adjacent to the first or second electrode, by selectively applying a data voltage to the second electrode of the electric field driven cell.

Advantageous Effects of Invention

According to the above-described technical means of the present disclosure to solve the problems, a more effective driving method for electric field driven cells including an actuator having no permanent charge can be realized. Especially, a self-active matrix array for electric field driving according to the present disclosure utilizes electrode lines, to which electrodes of an electric field driven cell having at least three electrodes are connected, as a common electrode line, a gate line, and a data line, respectively, which are arranged in a matrix form, and disposes an electric field driven cell as an individual pixel at an intersection of the gate line and the data line. In case of the active matrix array having the above-described configuration, self-active matrix addressing driving is possible without separately requiring a switching device and a capacitance device.

The electric field driven cells according to the present disclosure are useful in various fields such as an optical switch, an electric switch, and a display, and in particular, can be applied to an electronic paper display device.

BRIEF DESCRIPTION OF DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

MODE FOR THE INVENTION

Hereinafter, embodiments in accordance with the present disclosure will be described in detail by reference to the accompanying drawings so that the present disclosure may be readily implemented by those skilled in the art. However, it is to be noted that the present disclosure is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

Figure 1:
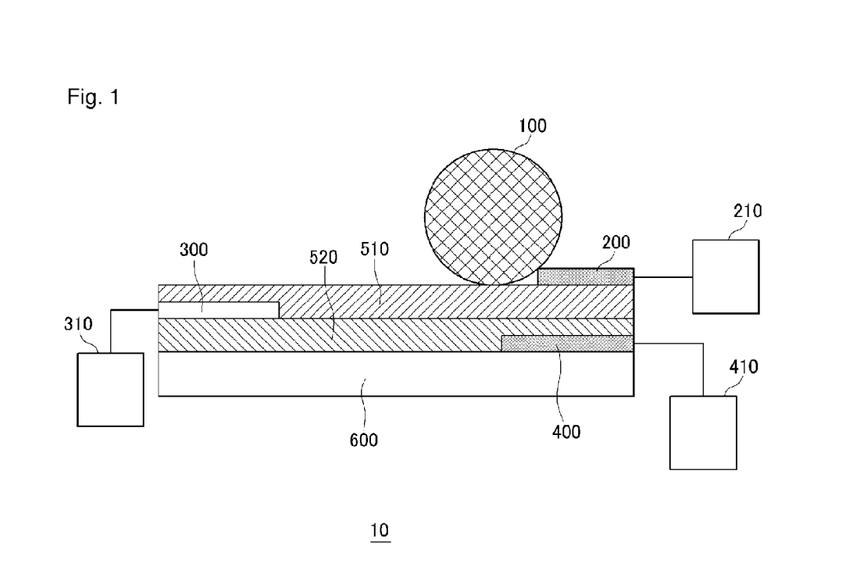
FIG. 1 is a view showing an electric field driven cell according to one embodiment of the present disclosure.

FIG. 1 is a view showing an electric field driven cell according to one embodiment of the present disclosure.

An electric field driven cell 10 as illustrated includes an actuator 100, a first electrode 200, a second electrode 300, a third electrode 400, a first insulation layer 510, a second insulation layer 520, and a substrate 600. The first electrode 200 of the electric field driven cell 10 is connected to a common electrode line 210. The second electrode 300 is connected to a gate line 310. The third electrode 400 is connected to a data line 410.

The first electrode 200 functions as a common electrode, to which common voltage is applied. The second electrode 300 functions as a gate electrode, to which gate voltage is applied. The third electrode 400 functions as a data electrode, to which data voltage is applied.

In this case, the first electrode 200 and the second electrode 300 are spaced from each other with a determined distance. The third electrode 400 is positioned below the first electrode 200. Accordingly, the distance between the first electrode 200 and the second electrode 300 is the same as or similar to the distance between the second electrode 300 and the third electrode 400.

The actuator 100 is movable in the space between the first electrode 200 and the second electrode 300, in accordance with voltage applied to the first to third electrodes 100, 200, and 300. The actuator 100 is in the state adjacent to the first electrode 200 or the second electrode 300, in accordance with voltage applied to the first to third electrodes 100, 200, and 300.

The actuator 100 has no permanent charge, and may be frequently charged to a positive charge or a negative charge in accordance with voltage to be applied. The actuator 100 is manufactured in a spherical or cylindrical shape for easy movement, and may have high contact resistance upon contacting with the first electrode 200. The actuator 100 in a spherical or cylindrical shape is in point contact with the first electrode 200 or the second electrode 300. Due to the narrow contact area, the actuator 100 has high contact resistance.

Size of the actuator 100 is the same as or smaller than the space between the first electrode 200 and the second electrode 300. Diameter of the actuator 100 may be several micrometers or tens of micrometers.

The electric field driven cell 10 may include a plurality of actuators 100.

The actuator 100 needs to be made of conductive material so as to be charged to a positive or negative charge by electrodes. However, since charged charges are positioned on a surface of a charged object, the actuator 100 as a whole does not need to be made of conductive material.

Figure 2A:
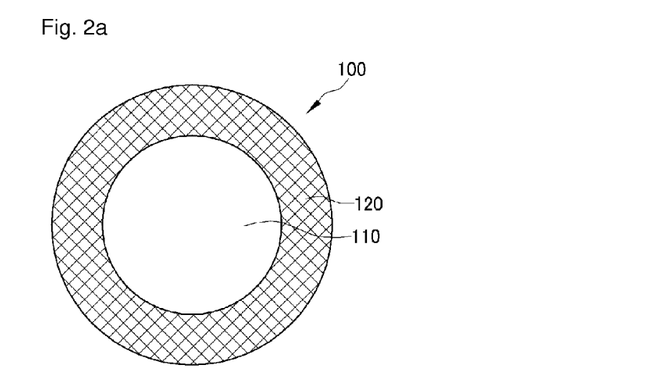
FIGS. 2a and 2b are cross-sectional views for explanation of detailed configuration of an actuator according to one embodiment of the present disclosure.
Figure 2B:
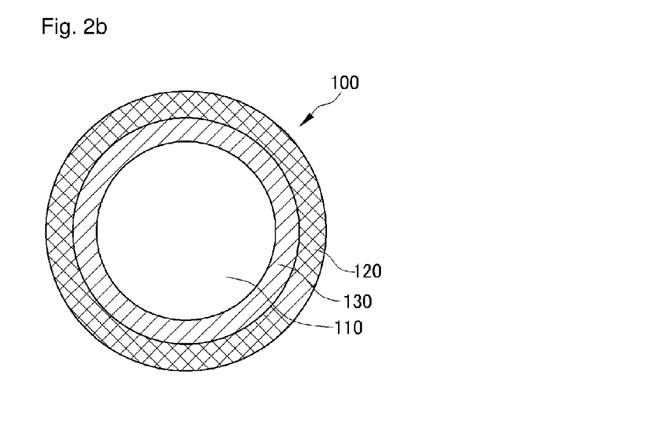

FIGS. 2a and 2b are cross-sectional views for explanation of detailed configuration of an actuator according to one embodiment of the present disclosure.

As illustrated in FIG. 2a, the actuator 100 may be formed with the structure, in which a conductive layer 120 is formed by coating an insulator ball 110 with conductive material. Thickness of the conductive layer 120 may have a value in a range of 10 Å to 10,000 Å, by carrying out coating within 20% of a diameter of the insulator ball 110.

In this case, force required to drive the actuator 100 and a driving speed are in inverse proportion to a weight of the actuator 100. Accordingly, polymer material having a light weight and a dielectric property is used for the insulator ball 110.

For the conductive layer 120, metals having a good electrical property such as gold or aluminum, or conductive materials such as transparent conductive oxide or conductive polymer may be used.

In accordance with products to which electric field driven cells are applied, color of the actuator 100 may be important. As illustrated in FIG. 2b, the actuator 100 further includes a colored layer 130.

The colored layer 130 may have one color selected from white, red, green, blue, yellow, magenta, cyan, and other desired colors. The colored layer 130 may be made of black non-penetrating material to exclude light to be reflected.

For the conductive layer 120 of the actuator 100 including the colored layer 130, transparent conductive materials such as ITO, IZO, ZnO, and $SnO_2$ are used to show the color of the colored layer 130.

With reference to FIG. 1 again, the first to third electrodes (200, 300, and 400) may be formed of transparent conductive materials such as ITO (indium tin oxide) or IZO (indium zinc oxide) or non-transparent conductive materials such as Cr, Al, and Mo.

The first insulation layer 510 is formed between the first electrode 200 and the second electrode 300 to insulate the actuator 100 from the second electrode 300.

The second insulation layer 520 is formed between the second electrode 300 and the third electrode 400 to insulate the second electrode 300 from the third electrode 400.

The substrate 600 may be a transparent or non-transparent substrate using a glass or flexible substrate.

Hereinafter, a method for controlling the state of the actuator 100 will be described.

An electric potential of the actuator 100 having no permanent charge may be defined by voltage applied to the first electrode 200 directly in contact with the actuator 100. An electric potential difference between the actuator 100 and each of the electrodes occurs in accordance with dimension of voltage applied to each of the electrodes. Due to the electric potential difference and the distance from the electrodes, an electric field is formed, and an electric force acting on the actuator 100 is generated.

That is, due to pulsed electric field or DC electric field applied to the second electrode 300, charge distribution on the actuator surface positioned at the first electrode 200 or the second electrode 300 occurs. Due to the charge redistribution, an attractive force by an electric field between the actuator in contact with the first electrode 200 and the second electrode 300 occurs. If the attractive force is stronger than an attractive force acting on the first electrode 200, at which the actuator is positioned, the actuator is movable. In this case, conditions for movement of the actuator may be determined by adjusting a variation speed or duration time of the pulsed electric field or DC electric field applied to the second electrode 300.

With respect to the electric potential of the actuator 100, which is defined by the first electrode 200, redistribution of charges occurs in accordance with voltage applied to the second electrode 300 and the third electrode 400. Since the actuator 100 is in a spherical or cylindrical shape, or a shape similar to a sphere, it has a small area for contact with the electrodes thereby increasing contact resistance. As a result, redistribution of charges occurs on the actuator surface having limited conductivity when an external electric field rapidly varies.

Especially, in order to generate variation of the electric potential of the actuator surface, an electric potential variation speed of the pulsed electric field or DC electric field is preferably greater than or the same as a speed of redistribution of charges on the actuator surface.

In this case, unlike the first electrode 200 that can be in direct contact with the actuator 100, the second electrode 300 and the third electrode 400, which are insulated from the actuator, have a memory property, such that the actuator 100 can stay at a position adjacent to each of the second electrode 300 and the third electrode 400.

In sum, if an electric field attractive force produced by an electric potential difference between the first electrode 200 and the second electrode 300 is smaller than an electric field attractive force produced by an electric potential difference between the first electrode 200 and the third electrode 400, the actuator 100 is in the state that it is positioned adjacent to the first electrode 200. In other words, since the first electrode 200 and the third electrode 400 are close in distance, the position of the actuator 100 can be maintained even with the small electric potential difference so that the memory effect can be achieved.

Under the condition that an electric field attractive force between the first electrode 200 and the third electrode 400 is 0 or smaller than a threshold value, if an electric field attractive force between the actuator 100 defined by the first electrode 200 and the second electrode 300 is sufficiently large, the actuator 100 moves toward the second electrode 300.

Figure 3:
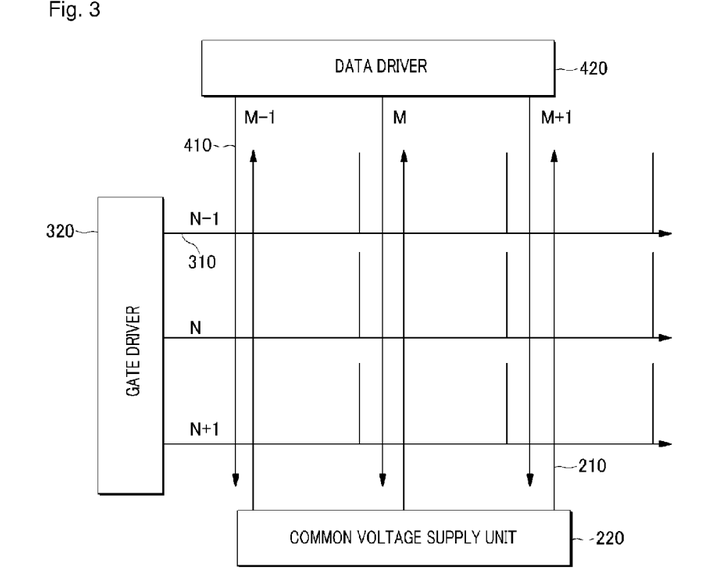
FIG. 3 is a view showing a circuit diagram of a circuit for driving electric field driven cells according to one embodiment of the present disclosure.

FIG. 3 is a view showing a circuit diagram of a circuit for driving electric field driven cells according to one embodiment of the present disclosure.

A circuit for driving electric field driven cells includes a common voltage supply unit 220, a gate driver 320, and a data driver 420. The circuit also includes various wires having a matrix array form and connected to respective electrodes of an electric field driven cell.

The circuit for driving electric field driven cells includes a common electrode line 210, a gate line 310, and a data line 410, which are connected to the first electrode 200, the second electrode 300, and the third electrode 400 of the electric field driven cell, respectively.

Figure 4A:
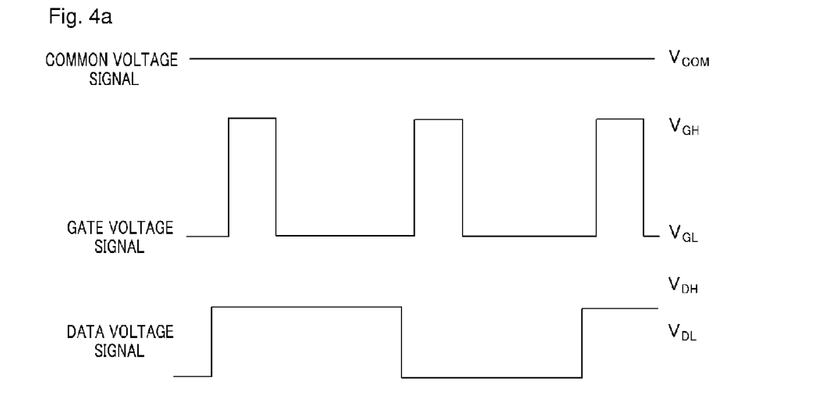
FIGS. 4a and 4b are views showing waveforms of various voltage signals applied to a circuit for driving electric field driven cells according to one embodiment of the present disclosure.
Figure 4B:
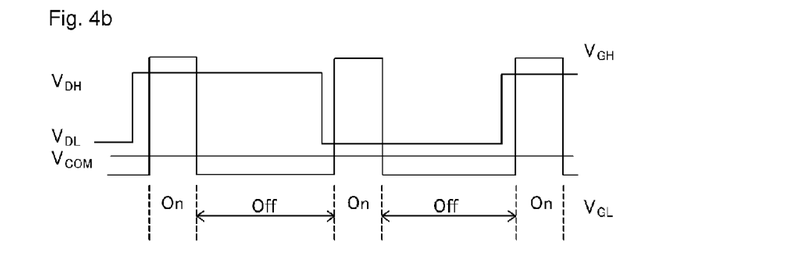

FIGS. 4a and 4b are views showing waveforms of various voltage signals applied to a circuit for driving electric field driven cells according to one embodiment of the present disclosure.

The common voltage supply unit 220 supplies a common voltage signal $V_{COM}$ to the first electrode 200 through the common electrode line 210. The gate driver 320 supplies a gate voltage signal $V_G$ in a pulse form to the second electrode 300 through the gate line 310. The data driver 420 supplies a data voltage signal $V_D$ to the third electrode 400 through the data line 410.

The common voltage signal $V_{COM}$ maintains a certain dimension of DC voltage for a unit frame time period. However, voltage having a waveform varying in its size may be applied for a unit frame time period, if necessary.

The gate voltage signal $V_G$ includes a high level gate voltage signal $V_{GH}$ supplied for a predetermined time period, for a wire selected from the plurality of gate lines 310, and a low level gate voltage signal $V_{GL}$ supplied for a non-selected wire. However, it is possible to adopt the constitution, in which the low level gate voltage signal $V_{GL}$ is applied for a wire selected according to an embodiment of the present disclosure, and the high level gate voltage signal $V_{GH}$ is applied to a non-selected wire.

With respect to the data voltage signal $V_D$, a signal capable of determining movement or stop of the actuator 100 after an $N^{th}$ gate line is selected and before an $N+1^{th}$ gate line is selected is applied. The data voltage signal $V_D$ includes a high level data voltage signal $V_{DH}$ and a low level data voltage signal $V_{DL}$.

For example, in the state that the high level gate voltage signal $V_{GH}$ is applied to a certain gate line $N^{th}$ gate line thereby actuating the corresponding gate line, the state of the actuator 100 may be controlled in accordance with a type of a data voltage signal applied to the data line. However, in the state that the gate line is deactivated, a certain state of the actuator 100 is maintained, regardless of a type of a data voltage signal.

FIG. 4b is a view showing relation of waveforms of various voltage signals applied to a circuit for driving electric field driven cells according to one embodiment of the present disclosure.

The common voltage signal $V_{COM}$ has a value similar to the low level gate voltage signal $V_{GL}$. The high level data voltage signal $V_{DH}$ has a value smaller than the high level gate voltage signal $V_{GH}$.

That is, the relation of the mathematical formula below is met.

$$V_{GL} \leq V_{COM} < V_{GH}$$

$$V_{COM} \leq V_{DL} < V_{DH} < V_{GH} \quad \text{[Mathematical Formula I]}$$

Each of the voltage signals has a pulse form, such that an electric potential variation speed of voltage applied is greater than or the same as a speed of redistribution of charges on the actuator surface.

Figure 5:
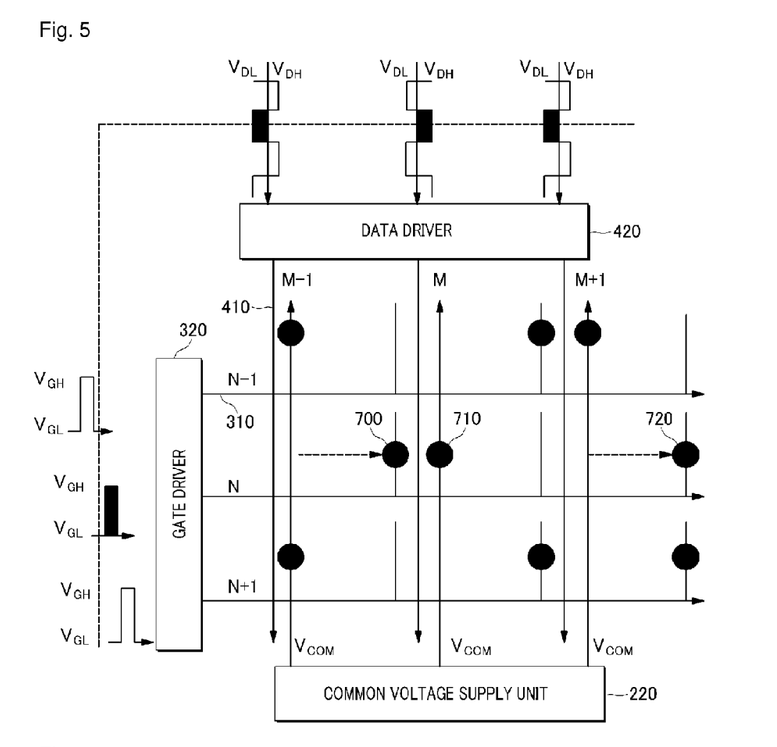
FIG. 5 is a view showing a method for driving electric field driven cells according to one embodiment of the present disclosure.

FIG. 5 is a view showing a method for driving electric field driven cells according to one embodiment of the present disclosure.

The present disclosure proposes a self-active matrix addressing (SAMA) method for an electric field driven panel.

First, common voltage $V_{COM}$ is applied to the common electrode of the electric field driven cell through the common voltage supply unit 220.

In order to activate a gate line connected to an electric field driven cell, which is desired to be driven, the high level gate voltage signal $V_{GH}$ is applied. In the drawing, an $N^{th}$ gate line is activated.

Once the gate line is activated, the state of the actuator 100 varies depending on the data voltage signal. That is, in case of the electric field driven cells 700, 720, in which the low level data voltage signal $V_{DL}$ is applied to the data line, an electric field attractive force (electric force) formed between the actuator 100 and the second electrode 300 is stronger than an electric field attractive force formed between the actuator 100 and the third electrode 400. Accordingly, the actuator 100 positioned adjacent to the first electrode 200 moves to a position adjacent to the second electrode 300. Due to an electric potential difference between the actuator 100 and the second electrode 300, the position of the actuator 100 is fixed until a new gate voltage signal and data voltage signal are applied for a next frame time period, so that the memory effect can be achieved.

In case of the electric field driven cell 710, in which the high level data voltage signal $V_{DH}$ is applied to the data line, an electric field attractive force formed between the actuator 100 and the second electrode 300 is smaller than an electric field attractive force formed between the actuator 100 and the third electrode 400 so that the actuator 100 still stays at a position adjacent to the first electrode 200.

In the case where the actuator 100 is positioned adjacent to the second electrode 300, in order to move the actuator 100 to a position adjacent to the first electrode 200, the high level data voltage signal $V_{DH}$ is applied, in the state that a corresponding gate line is activated.

Figure 6:
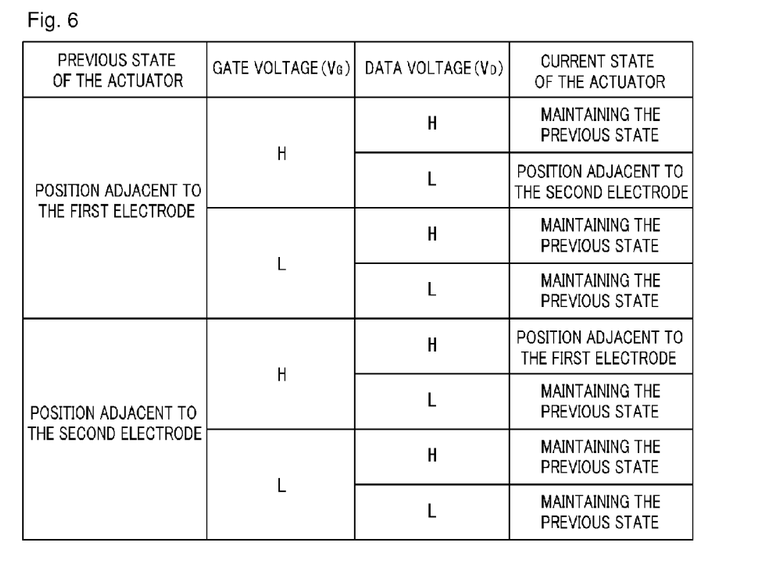
FIG. 6 is a view showing summary of state variation of electric field driven cells depending on a method for driving electric field driven cells according to one embodiment of the present disclosure.

FIG. 6 is a view showing summary of state variation of an electric field driven cell depending on a method for driving electric field driven cells, according to one embodiment of the present disclosure.

As illustrated, in the case where the gate line is deactivated due to application of the low level gate voltage $V_{GL}$, a previous state is maintained despite of variation of the data voltage signals.

Next, in the state that the high level gate voltage $V_{GH}$ is applied, state variation of the actuator 100 is determined depending on the state of the actuator 100 and a type of the data voltage $V_D$.

If the actuator 100 is positioned adjacent to the first electrode 200, when the low level data voltage $V_{DL}$ is applied, the actuator 100 moves to a position adjacent to the second electrode 300.

If the actuator 100 is positioned adjacent to the second electrode 300, when the high level data voltage $V_{DH}$ is applied, the actuator 100 moves to a position adjacent to the first electrode 200.

Figure 7:
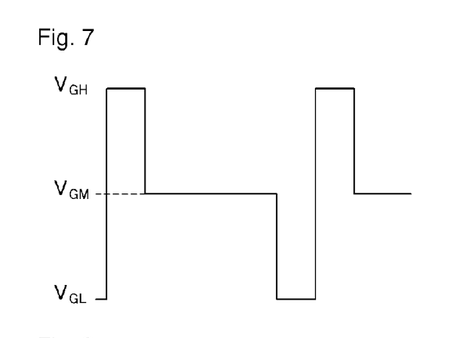
FIG. 7 is a view showing a form of gate voltage applied to a circuit for driving electric field driven cells according to one embodiment of the present disclosure.

FIG. 7 is a view showing a form of gate voltage applied to a circuit for driving electric field driven cells according to one embodiment of the present disclosure.

In the process of transition from the high level gate voltage $V_{GH}$ to the low level gate voltage $V_{GL}$, a middle level of gate voltage $V_{GM}$ is applied for a predetermined time period.

Assuming that the actuator 100 is positioned adjacent to the second electrode 300, when gate voltage directly drops from the high level to the low level, there is a possibility that an electric field attractive force between the actuator 100 and the second electrode 300 rapidly varies. In this case, when the electric field attractive force becomes smaller than an electric field attractive force between the actuator 100 and the third electrode 400, the actuator 100 is returned to the position adjacent to the first electrode 200, so that the memory effect is not obtained.

Especially, in the case where the gate line is deactivated, the actuator needs to be controlled to maintain its previous state, regardless of the level of the data voltage signals. Even if the low level gate voltage is applied to the gate line, if data voltage is overly large, there is a possibility that a defect occurs, namely, the actuator positioned adjacent to the second electrode 300 moves to a position adjacent to the first electrode 200.

In order to prevent the defect, the pulse of the gate voltage signal may drop step by step. In other words, a third level, i.e., the middle level $V_{GM}$, except for the high level $V_{GH}$ and the low level $V_{GL}$ is maintained for at least a certain time period.

In this case, a dimension of the middle level of the gate voltage $V_{GM}$ is determined to be a value between the high level gate voltage $V_{GH}$ and the low level gate voltage $V_{GL}$.

Preferably, the dimension is determined to be ½ of a difference between the high level gate voltage $V_{GH}$ and the low level gate voltage $V_{GL}$.

With this configuration, the memory effect of the actuator 100 is improved for a time period for drop of the gate voltage or deactivation of the gate. A dimension of voltage applied to each of the electrodes is not an absolute value, and may vary depending on a size of the actuator, spacing between the electrodes, and conductivity of the actuator.

Figure 8:
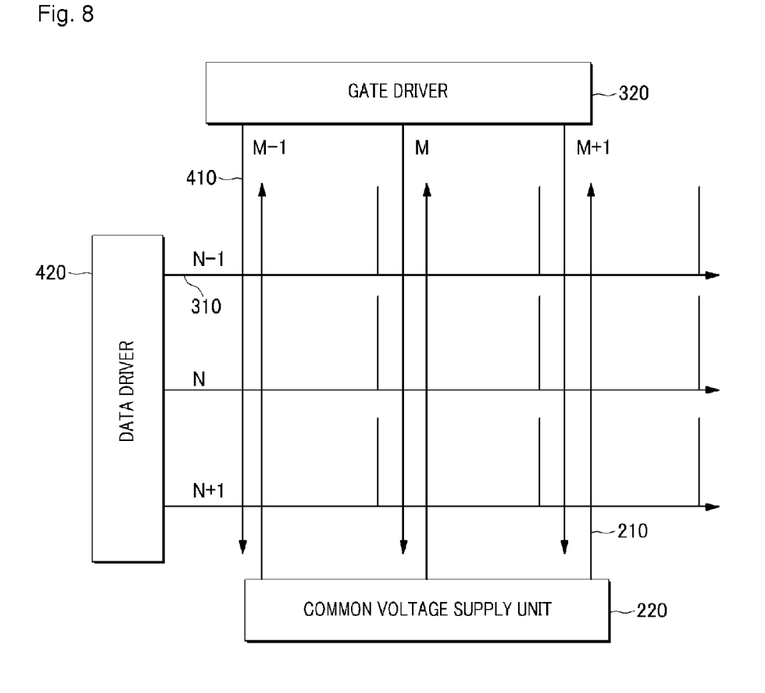
FIG. 8 is a view showing a circuit diagram of a circuit for driving electric field driven cells according to another embodiment of the present disclosure.

FIG. 8 is a view showing a circuit diagram of a circuit for driving electric field driven cells according to another embodiment of the present disclosure.

The entire configuration in FIG. 8 is similar to that in FIG. 3. However, voltage applied to the second electrode 300 and the third electrode 400 of the electric field driven cell in FIG. 8 is different from that in FIG. 3.

In FIG. 8, unlike the example in FIG. 3, data voltage is applied to the second electrode 300, and gate voltage is applied to the third electrode 400. To the end, the data driver 420 supplies the data voltage signal $V_D$ to the second electrode 300. The gate driver 320 supplies the gate voltage signal $V_G$ to the third electrode 400.

In the state that the actuator 100 is positioned adjacent to the first electrode 200, gate voltage in a pulse or stair-case wave form, which meets the mathematical formula 1, is applied to the third electrode 400. When the high level data voltage is applied to the second electrode 300, an electric potential difference between the actuator 100 and the second electrode 300 is a maximum value thereby generating a maximum electric field attractive force (electric force). Accordingly, the actuator 100 moves to a position adjacent to the second electrode 300.

In the state that the actuator 100 is positioned adjacent to the second electrode 300, gate voltage in a pulse or stair-case wave form, which meets the mathematical formula 1, is applied to the third electrode 400. When the low level data voltage is applied to the second electrode 300, an electric potential difference between the actuator 100 and the second electrode 300 is a minimum value so that an electric field attractive force (electric force) between the actuator 100 and the second electrode 300 is a minimum value. Accordingly, the actuator 100 moves to a position adjacent to the first electrode 200 and the third electrode 400.

Figure 9:
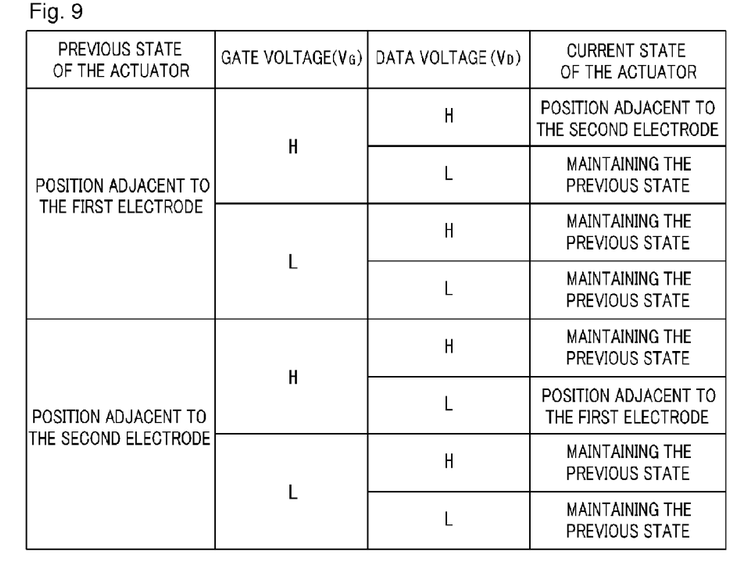
FIG. 9 is a view showing description of state variation of electric field driven cells depending on a method for driving electric field driven cells according to another embodiment of the present disclosure.

FIG. 9 is a view showing summary of state variation of an electric field driven cell depending on a method for driving electric field driven cells according to another embodiment of the present disclosure.

As illustrated, in the case where the gate line is deactivated due to application of the low level gate voltage $V_{GL}$, a previous state is maintained, despite of variation of the data voltage signals.

Next, in the state that the high level gate voltage $V_{GH}$ is applied, state variation of the actuator 100 is determined depending on the state of the actuator 100 and a type of the data voltage $V_D$.

If the actuator 100 is positioned adjacent to the first electrode 200, when the high level data voltage $V_{DH}$ is applied, the actuator 100 moves to a position adjacent to the second electrode 300.

If the actuator 100 is positioned adjacent to the second electrode, when the low level data voltage $V_{DL}$ is applied, the actuator 100 moves to a position adjacent to the first electrode 200.

The electric field drive cell has been described based on the case where the actuator 100 moves in a horizontal direction. However, the electric field driven cell may be configured such that the actuator 100 moves in a vertical or diagonal direction based on the same principle as stated above.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

The invention claimed is:

1. An apparatus for driving an electric field driven cell array including a plurality of electric field driven cells,
wherein each of the electric field driven cells includes a first electrode, a second electrode, and a third electrode, which are provided on a substrate and insulated from one another, and an actuator movable between the first electrode and the second electrode, wherein the first electrode and the second electrode are spaced from each other with a predetermined distance, and the third electrode is disposed below the first electrode, the apparatus including:
a common voltage supply unit for supplying a common voltage to the first electrode of the electric field driven cell;
a gate driver for supplying a gate voltage to the second electrode of the electric field driven cell by a gate line; and
a data driver for supplying a data voltage to the third electrode of the electric field driven cell by a data line,
wherein the actuator is positioned adjacent to the first electrode or the second electrode in accordance with a state of the gate voltage and the data voltage,
wherein if a high level gate voltage drops to a low level gate voltage, the gate driver maintains a voltage level between the high level gate voltage and the low level gate voltage for a certain time period before the gate voltage reaches the low level thereof.

2. The apparatus for driving an electric field driven cell array claimed in claim 1, wherein the actuator comprises conductive material and has no permanent charge.

3. The apparatus for driving an electric field driven cell array claimed in claim 1, wherein if a high level gate voltage is applied to the second electrode in the state that the actuator is positioned adjacent to the first electrode, when a low level data voltage is applied to the third electrode, the actuator moves to a position adjacent to the second electrode.

4. The apparatus for driving an electric field driven cell array claimed in claim 1, wherein if a high level gate voltage is applied to the second electrode in the state that the actuator is positioned adjacent to the second electrode, when a high level data voltage is applied to the third electrode, the actuator moves to a position adjacent to the first electrode.

5. The apparatus for driving an electric field driven cell array claimed in claim 1, wherein if a high level gate voltage drops to a low level gate voltage, the gate driver enables the gate voltage to reach the low level and maintain at the low level for a certain time period.

6. The apparatus for driving an electric field driven cell array claimed in claim 1, wherein if a high level gate voltage drops to a low level gate voltage, the gate driver maintains a voltage level corresponding to ½ of a difference value between the high level gate voltage and the low level gate voltage for at least a certain time period before the gate voltage reaches the low level thereof.

7. The apparatus for driving an electric field driven cell array claimed in claim 1, wherein each of the electric field driven cells is not connected to a capacitance device or an active switching device for activation of each of the electric field driven cells.

8. An apparatus for driving an electric field driven cell array including a plurality of electric field driven cells,
wherein each of the electric field driven cells includes a first electrode, a second electrode, and a third electrode, which are provided on a substrate and insulated from one another, and an actuator movable between the first electrode and the second electrode, wherein the first electrode and the second electrode are spaced from each other with a predetermined distance, and the third electrode is disposed below the first electrode, the apparatus including:
a common voltage supply unit for supplying a common voltage to the first electrode of the electric field driven cell;
a gate driver for supplying a gate voltage to the third electrode of the electric field driven cell by a gate line; and
a data driver for supplying a data voltage to the second electrode of the electric field driven cell by a data line;
wherein the actuator is positioned adjacent to the first electrode or the second electrode in accordance with supply state of the gate voltage and the data voltage,
wherein if a high level gate voltage drops to a low level gate voltage, the gate driver maintains a voltage level between the high level gate voltage and the low level gate voltage for a certain time period before the gate voltage reaches the low level thereof.

9. The apparatus for driving an electric field driven cell array claimed in claim 8, wherein if a high level gate voltage is applied to the third electrode in the state that the actuator is positioned adjacent to the first electrode, when a high level data voltage is applied to the second electrode, the actuator moves to a position adjacent to the second electrode.

10. The apparatus for driving an electric field driven cell array claimed in claim 8, wherein if a high level gate voltage is applied to the third electrode in the state that the actuator is positioned adjacent to the second electrode, when a low level data voltage is applied to the second electrode, the actuator moves to a position adjacent to the first electrode.

11. A method for driving an electric field driven cell array including a plurality of electric field driven cells, wherein each of the electric field driven cells includes a first electrode, a second electrode, and a third electrode, which are provided on a substrate and insulated from one another, and an actuator movable between the first electrode and the second electrode, wherein the first electrode and the second electrode are spaced from each other with a predetermined distance, and the third electrode is disposed below the first electrode, the method including:
(a) applying a certain level of common voltage to the first electrode of the electric field driven cell;
(b) activating a gate line of an electric field driven cell, which is desired to operate, by selectively applying a gate voltage to the second electrode of the electric field driven cell; and
(c) positioning the actuator at a position adjacent to the first electrode or the second electrode, by selectively applying a data voltage to the third electrode of the electric field driven cell,
wherein (b) activating a gate line by applying the gate voltage includes maintaining the gate voltage at a level between a high level gate voltage and a low level gate voltage for at least a certain time period, when the high level gate voltage drops to the low level gate voltage.

12. The method for driving an electric field driven cell array claimed in claim 11, wherein (b) activating a gate line by applying the gate voltage includes maintaining the gate voltage at the low level for at least a certain time period, when a high level gate voltage drops to a low level gate voltage.

13. The method for driving an electric field driven cell array claimed in claim 11, wherein (b) activating a gate line by applying the gate voltage includes maintaining the gate voltage at a level corresponding to ½ of a difference value between a high level gate voltage and a low level gate voltage for at least a certain time period, when the high level gate voltage drops to the low level gate voltage.

14. The method for driving an electric field driven cell array claimed in claim 11, wherein (c) positioning the actuator at a position adjacent to the first electrode or the second electrode includes moving the actuator to a position adjacent to the second electrode by applying a low level data voltage to the third electrode, when a high level gate voltage is applied to the second electrode in the state that the actuator is po- sitioned adjacent to the first electrode.

15. The method for driving an electric field driven cell array claimed in claim 11, wherein (c) positioning the actuator at a position adjacent to the first electrode or the second electrode includes moving the actuator to a position adjacent to the first electrode by applying a high level data voltage to the third electrode, when a high level gate voltage is applied to the second electrode in the state that the actuator is positioned adjacent to the second electrode.

16. A method for driving an electric field driven cell array including a plurality of electric field driven cells, wherein each of the electric field driven cells includes a first electrode, a second electrode, and a third electrode, which are provided on a substrate and insulated from one another, and an actuator movable between the first electrode and the second electrode, wherein the first electrode and the second electrode are spaced from each other with a predetermined distance, and the third electrode is disposed below the first electrode, the method including:
(a) applying a certain level of common voltage to the first electrode of the electric field driven cell;
(b) activating a gate line of an electric field driven cell, which is desired to operate, by selectively applying a gate voltage to the third electrode of the electric field driven cell; and
(c) positioning the actuator at a position adjacent to the first electrode or the second electrode, by selectively applying a data voltage to the second electrode of the electric field driven cell,
wherein (b) activating a gate line by applying the gate voltage includes maintaining the gate voltage at a level between a high level gate voltage and a low level gate voltage for at least a certain time period, when the high level gate voltage drops to the low level gate voltage.

17. The method for driving an electric field driven cell array claimed in claim 16, wherein (c) positioning the actuator at a position adjacent to the first electrode or the second electrode includes moving the actuator to a position adjacent to the second electrode by applying a high level data voltage to the second electrode, when a high level gate voltage is applied to the third electrode in the state that the actuator is positioned adjacent to the first electrode.

18. The method for driving an electric field driven cell array claimed in claim 16, wherein (c) positioning the actuator at a position adjacent to the first electrode or the second electrode includes moving the actuator to a position adjacent to the first electrode by applying a low level data voltage to the second electrode, when a high level gate voltage is applied to the third electrode in the state that the actuator is positioned adjacent to the second electrode.

* * * * *